…

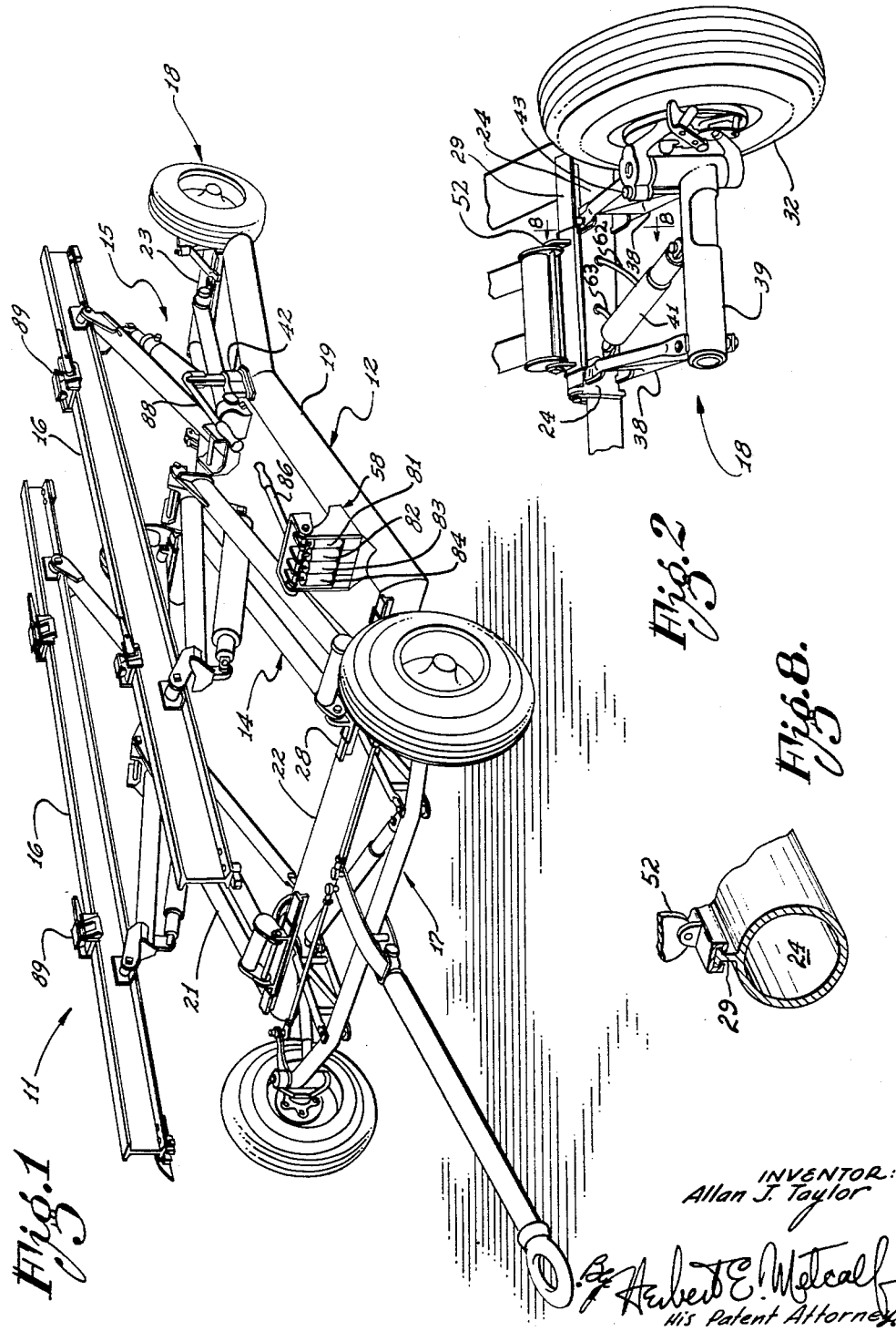

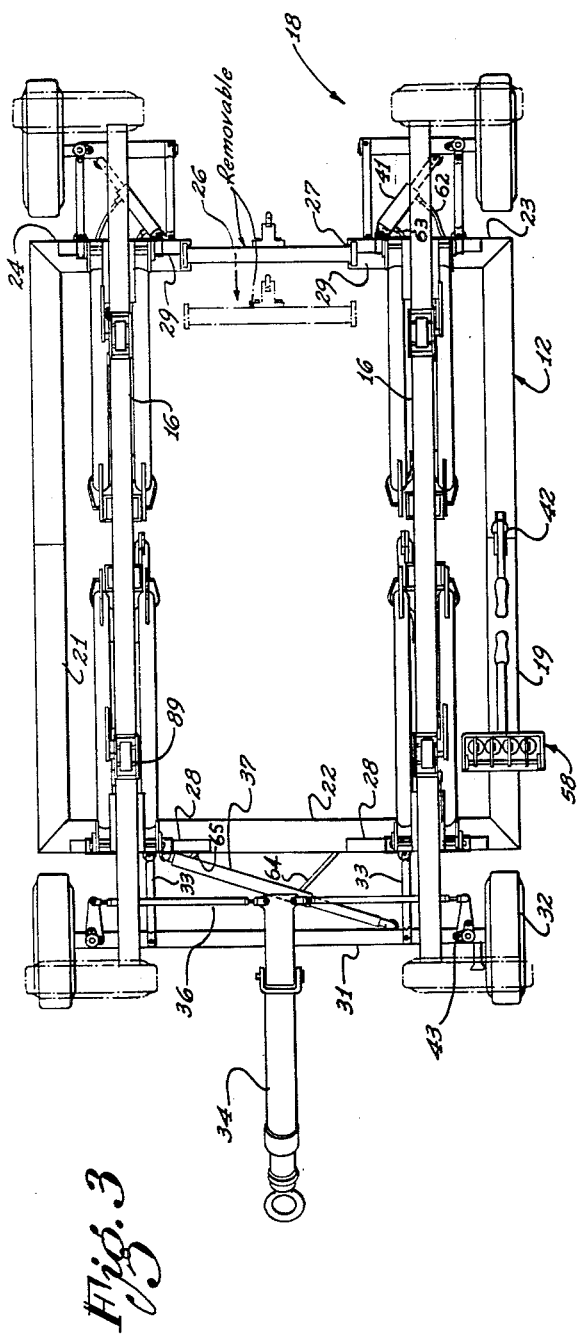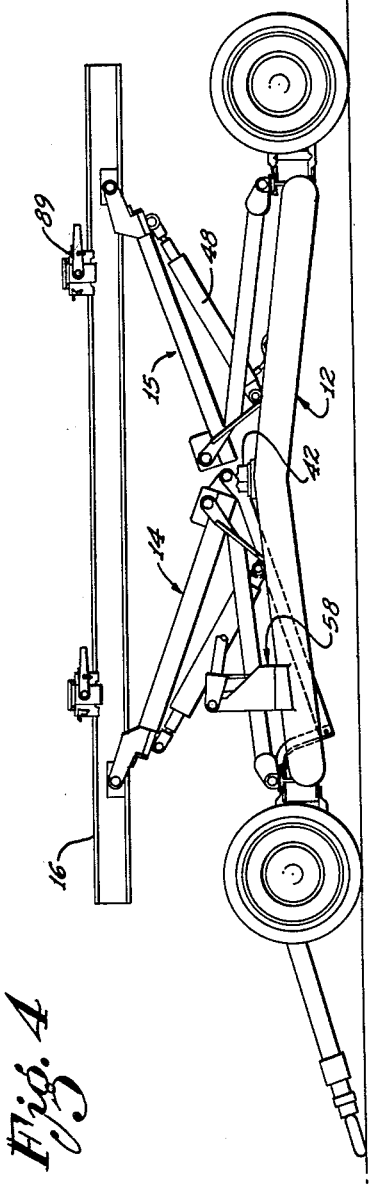

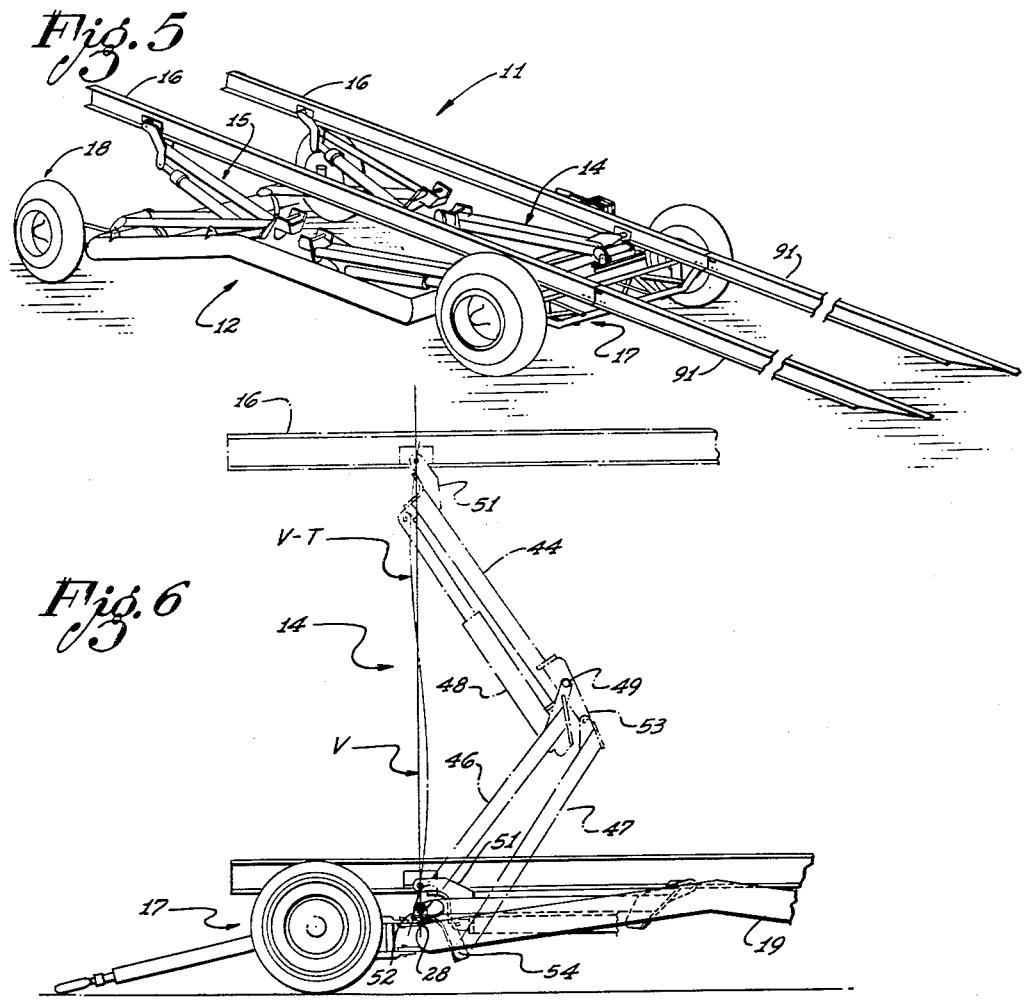
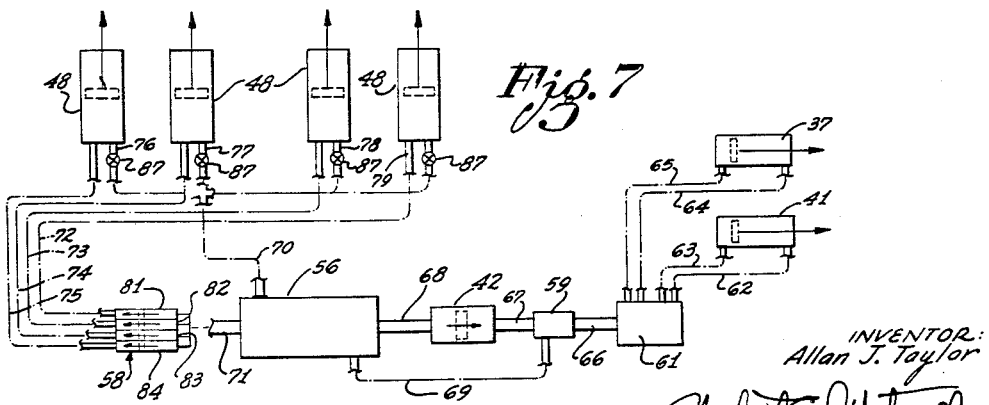

United States Patent Office 2,929,519
Patented Mar. 22, 1960

2,929,519

ELEVATING TRAILER

Allan J. Taylor, Pacific Palisades, Calif., assignor to Northrop Corporation, Hawthorne, Calif., a corporation of California Application November 27, 1956, Serial No. 624,556

7 Claims. (Cl. 214—1)

This invention relates to material handling equipment and more particularly to elevating type dollies having general utility in the handling of heavy equipment and especially such components as jet aircraft engines and the like.

The operational scope and usefulness of an elevating dolly quite frequently is unduly limited by structural features of the dolly which have been eliminated by novel construction features embodied in the dolly as disclosed herein. For example, in the handling of heavy equipment by conventional elevating and transportation type dollies it is usually necessary to employ auxiliary hoisting apparatus to place components in position on the subject dollies. This type of equipment not only requires additional equipment but also limits the effective minimum height at which the dolly can operate.

Briefly the present invention discloses an elevating type dolly the base structure of which is of U-shaped configuration in plan. This type of construction permits the dolly to encompass components which are to be picked up and subsequently transported. Accordingly a dolly constucted as disclosed herein is able to make its own initial lift and transport the subject components without the use of auxiliary hoisting equipment. Further, the present dolly embodies individual supporting rails which are separately operated to provide novel means for imparting rolling and tilting movements to components supported thereon without utilizing a conventional cradle or the like. Also the supporting rails mounted in this manner permit movement thereof in other than horizontal planes to provide advantages that will become apparent as the disclosure progresses.

Accordingly it is an object of the present invention to provide an elevating type dolly which can encompass equipment or components which are to be hoisted and thereby accomplish its own lift.

Another object is to provide an elevating type dolly in which the supporting rails thereof are individually mounted and may be separately or jointly operated to permit rolling movements to be imparted to components mounted thereon.

Another object is to provide an elevating type dolly in which the supporting rails thereof are individually mounted and separately operated to permit fore and aft angular movement thereof.

Another object is to provide an elevating type dolly embodying wheel assemblies mounted at the fore and aft ends thereof in a novel manner to provide lateral movement of the supporting structure of the dolly with respect to the wheel assemblies.

Another object is to provide an elevating type dolly in which the base frame thereof is arched upwardly intermediate its end portions to provide adequate clearance at such times as the dolly is moved over a ramp or the like.

Another object is to provide an elevating type dolly which is light in weight and simple in design yet rugged in construction, economical to manufacture and which may be easily adapted to any purpose for which it is intended.

Although the characteristic features of the present invention are particularly pointed out in the appended claims, the invention itself, also the manner in which it may be carried out, will be better understood by referring to the following descriptions taken in connection with the accompanying drawings forming a part of this application and in which:

Figure 1 is a perspective view of the elevating dolly as disclosed herein.

Figure 2 is a fragmentary perspective view of the dolly of Figure 1 showing a typical rear wheel and linkage assembly.

Figures 3 and 4 are plan and elevational views, respectively, of the elevating dolly of Figure 1.

Figure 5 is a perspective view of the dolly similar to that of Figure 1 but in which the supporting rails thereof have been titled to permit self-loading.

Figure 6 is an enlarged fragmentary side view of the dolly shown in Figure 1.

Figure 7 is a schematic showing of the hydraulic system employed in operating the dolly of Figure 1.

Figure 8 is a fragmentary perspective view in section of the rear wheel and linkage assembly of Figure 2 taken on the line 8—8 as indicated in the latter figure.

Referring to the drawings and particularly Figure 1, an elevating dolly 11 of the type disclosed herein is shown. Principal components of the dolly consists of a base frame assembly 12, fore and aft individual linkage assemblies 14 and 15, respectively, mounted on the assembly 12 to provide supporting structure and means for elevating and lowering a pair of supporting rails 16. The dolly is rendered steerable and mobile by means of a steering and wheel assembly 17 and a pair of wheel assemblies 18. The steering and wheel assembly 17, located at the forward end of the frame assembly 12, is hereinafter referred to as the forward wheel assembly. The pair of wheel assemblies 18, located at the aft end of the frame assembly 12, are hereinafter referred to as the aft wheel assemblies.

In the present embodiment the frame assembly 12 preferably is constructed of welded aluminum tubing and consists of a pair of side members 19 and 21, a cross member 22, a pair of end members 23 and 24 and a removable member 26, as best seen in Figure 3. The member 22 extends laterally between the side members 19 and 21 at the forward ends of the latter members. The members 23 and 24 extend laterally inwardly from the aft ends of the side members and terminate in spaced relation with respect to each other to provide clearance or a passageway therebetween for a purpose which will become apparent as the disclosure progresses. Respective grooves 27 are provided in the terminal ends of the members 23 and 24 and are adapted to receive T-shaped ends of the removable member 26 when the latter is in position between the ends of the members 23 and 24.

The side members 19 and 21 are arched and have their highest portion adjacent their midsections as best seen in Figures 1 and 4. This construction insures adequate clearance between the side members and the supporting surface of a ramp or the like and also allows the side members and the dolly generally to be positioned nearer the ground than would otherwise be possible. Fore and aft laterally extending track members 28 and 29, mounted respectively on the cross-member 22 and lateral members 23 and 24 as by welding or the like, provide means for slideably securing the individual linkage assemblies 14 and 15 on the assembly 12 as best seen in Figures 1, 2 and 8.

Linkage means for both the forward and aft wheel assemblies 17 and 18 include parallelogram type linkages.

The forward wheel assembly includes an axle 31 carrying a wheel 32 journaled at each end thereof. The axle 31 is pivotally attached to the member 22 by means of spaced connecting links 33 which when considered with the axle 31 and member 22 provide one of the aforementioned parallelogram linkages. The dolly is steered by means of a tow bar 34 and the tie rods 36. Also extending diagonally between the member 22 and the axle 31 is a pivotally mounted hydraulic actuator 37 which acts to perform a function which will be apparent presently.

The aft wheel assemblies 18 are of similar construction, one being a right and one a left hand unit. The right hand assembly 18 is attached to the member 24 by means of spaced connecting links 38—38 (Figure 2) pivotally attached to the member 24 and the outer ends thereof are pivotally attached to a member 39 which in turn is pivotally attached to the journal of the right rear wheel 32. The links 38—38 have a parallel relationship and with the members 24 and 39 constitute another one of the aforementioned parallelogram linkages. Also extending diagonally between the members 24 and 39 is a pivotally mounted actuator 41. It will be apparent that the inner and outer ends of the links 38 (also the links 33) are attached to supporting structure at vertically aligned and spaced positions. Thus the wheel assemblies provide supports for the frame assembly 12 and maintain the latter at a predetermined height above a supporting surface.

The aft wheel assemblies 18 are provided with locking or positioning pins 43 enabling the wheels to be fixedly secure in two distinct positions. In one position the pins 43 retain the wheels in alignment with the longitudinal axis of the dolly 11 as shown by solid construction in Figure 3. In the other position the wheels are positioned normal to the longitudinal axis of the dolly as shown by phantom construction. The forward wheel assembly 17 is also provided with a pin 43 which functions in the same manner as the pins 43 associated with the assemblies 18. Thus it will be apparent that the wheels 32 can be locked in the latter position and the dolly 11 moved in a sidewise direction. As previously mentioned it is to be understood that the left hand wheel assembly 18 is constructed similarly as the right hand wheel assembly just described.

Hydraulic fluid for the actuators 37 and 41 is pressurized by a manually operated pump 42 mounted on the base frame 12 substantially as shown in Figures 1 and 3. The hydraulic system for the dolly will be described in detail in connection with Figure 7. However, in view of the above description it will be apparent that as pressurized fluid is supplied to the actuators 37 and 41 the frame assembly 12, also components carried by the supporting rails 16, will be moved laterally (either to the right or left) with respect to the wheels 32 or stationary structure.

The supporting rails 16 are mounted on the base frame assembly 12 for lateral and vertical movement thereon by means of the aforementioned track members 28 and 29 and fore and aft individual linkage assemblies 14 and 15, respectively. These linkage assemblies as best seen in Figure 6 are similar in construction to those shown and described in applicant's copending application entitled Elevating Dolly, Serial Number 544,850, dated November 4, 1955. Inasmuch as the fore and aft linkage assemblies 14 and 15 are similar a forward linkage assembly 14 only will be briefly described. The assemblies 14 and 15 will hereinafter be referred to as the main and auxiliary linkage asemblies, respectively.

Referring to Figure 6, it will be seen that the principal components of the main linkage assembly 14 includes upper and lower links 44 and 46, respectively, an auxiliary link 47, and a cylinder and piston type hydraulic actuator 48. The upper and lower links are pivotally connected at common ends by pin means as indicated at 49 to provide a scissor type linkage. The other end of the upper link 44 is pivotally attached to the supporting rail 16 by means of a fitting 51. The inner end of the lower link 46 is pivotally attached to a member 52, the latter member being mounted for sliding movement on the track member 28. Pins (not shown) provide means whereby movement of the members 52, and accordingly movement of the linkage assemblies 14 and 15, may be arrested at any one of a plurality of positions located longitudinally along the track member 28.

Extending between an outer end extension 53 of the upper link 44 and the outer end of a link 54, depending from and attached to the member 52 and supported by the member 22, is the auxiliary link 47. Respective ends of the auxiliary link 47 are pivotally attached to the extension 53 and depending link 54. Also pivotally attached to a depending portion of the fitting 51 and a depending portion of the outer end of the lower link 46 is the hydraulic actuator 48. Pressurized fluid for the actuator 48 is provided by the aforementioned hydraulic system to be described later.

The aft linkage assemblies 15 are identical to the linkage assembly just described except that the auxiliary 47 is omitted from the assemblies 15.

The location of the common pivotal axis of the links 44 and 46 also the respective pivotal axis of the auxiliary link 47 on the extension 53 and depending link 54 are empirically determined. With the above pivotal points (axes) properly located the common pivotal axis of the upper link 44 and the rail 16 will follow the dot and dash line V–T. The path defined by the line V–T will not vary from the vertical line V to any great extent throughout the predetermined range or travel of the assemblies 14.

It will be noted that the longitudinal movement of the auxiliary linkages 15 will be controlled by the main linkage assemblies 14 acting through the rails 16. Further, it will be noted that in the collapsed or lowered position of the assembly 14, as shown by solid construction in Figure 6, portions of the fitting 51 rest on the innermost end of the lower link 46. Cooperation between the upper and auxiliary links 44 and 47 support the linkage assembly 14 in a substantially horizontal position when collapsed. Also it should be noted that the linkage assemblies on one side of the dolly are not directly connected with the linkage assemblies on the other side of the dolly. Accordingly the linkage assemblies on one side of the dolly may be moved laterally on the respective tracks 28 and 29 relative to the linkage assemblies on the opposite side of the dolly.

The above type of construction insures large vertical movement of the rails 16 in response to small movements of the actuator 48. Actual tests show that for each linear unit of expansion or retraction of the actuators 48 the rails 16 are moved through a vertical distance of approximately five linear units of the same magnitude as those through which the actuators are moved. This multiplication of vertical distance for small movements of the actuators is extremely important in elevating dolly construction as it permits the use of actuators having relatively short strokes and at the same time insures extensive vertical movements of the rails 16 and components supported thereon.

The hydraulic system for the dolly 11 includes a reservoir 56, pump assemblies 42 and 58, by-pass valve 59, a selector valve 61 and the hydraulic actuators 37, 41 and 48, connected by tubing or flexible hose 62 to 79, inclusive. The reservoir 56 and valves 59 and 61 may be placed within the tubing comprising the base assembly 12. All components of the above hydraulic system are conventional with the exception of the pump assembly 58.

The pump assembly 58, as constructed in the present embodiment, includes four individual plunger type pumps 81, 82, 83, and 84. The outer ends of the plungers of the pumps 81, 82, 83, and 84 may be readily connected or disconnected to the handle 86 either singly or in any combination as desired. Accordingly as the handle 86 is actuated pressurized fluid may be supplied to any of the actuators 48 singly, to the two actuators 48 located either at the fore or aft end of the dolly, or to the two respective actuators located on the right or left hand side of the dolly. Fluid may return from the actuators 48 to the reservoir 56 at such times as the valves 87 located in the lines 76—79, are open to return flow. The pump 42, which supplies pressurized fluid to the actuators 37 and 41, is manually operated by means of a handle 88.

Supporting fixtures 89, adapted to support components to be carried by the dolly 11, are mounted for longitudinal movement on the supporting rails 16. These fixtures, in addition to being able to move longitudinally of the rails 16, include means (not shown) enabling them to be secured at any longitudinal position desired on the rails 16. Also they (fixtures 89) include means (not shown) allowing limited rocking movement of portions thereof in a plane normal to the axis of a respective rail and also means (not shown) which allow portions thereof to move laterally with respect to the dolly 11.

The component parts of the dolly 11 having been described the operation and novel features thereof will be pointed out and briefly discussed. If components of varying sizes (particularly of different widths) are to be handled by the dolly 11 it will be apparent that the linkage assemblies 14 and 15, located respectively on the same side of the dolly 11, may be moved either inboard or outboard on the tracks 28 and 29 as required to accommodate the particular component in a manner as previously explained.

Lateral movement of the base frame assembly 12 and the elevating structure of the dolly 11, with respect to the wheels 32 or other reference structure, is imparted thereto by the actuators 37 and 41. By directing pressurized fluid to the fore and aft ends of the actuators 37 and 41 the assembly 12 will be caused to move as desired either to the right or left on the parallelogram linkages located at the fore and aft ends of the base frame assembly 12. Also lateral movement may be imparted to the complete dolly 11 by positioning the wheels 32 in the position shown by phantom construction in Figure 3.

Longitudinal movement may be imparted to components carried by the dolly 11 either by moving the dolly on the wheels 32 or by moving the fittings 89 along the rails 16 in a conventional manner. Rolling movement is imparted to components carried by the dolly by elevating or lowering one of the rails 16 while the other rail is maintained stationary. The fixtures 89 permit the above operation which is accomplished by actuating respective linkage assemblies 14 and 15 located on the same side of the dolly. Thus it will be seen that rolling movement is accomplished in the present dolly without the use of a conventional cradle or the like.

Tilting movement may be imparted to components carried by the trailer by elevating or lowering respective ends of the rails 16. This movement is accomplished by actuating simultaneously and by equal amounts linkage assemblies 14 or the linkage assemblies 15 by means of the pump assembly 58 as previously described.

Components may be removed from and positioned on the dolly 11 without the use of auxiliary hoisting equipment in the manner illustrated in Figure 5. In this instance the rails 16 are tilted either in a fore or aft direction substantially as shown. Rail extensions 91 are provided which are attached to the rails 16 to provide continuous tracks extending to the ground. It will now be apparent that components to which the fittings 89 have been previously attached may be moved up the ramp provided by the extensions 91 and placed in position on the rails 16.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An elevating dolly comprising: an elongated wheeled frame assembly symmetrically constructed about a longitudinal axis; first and second elongated support members mounted on said frame assembly for movement through respective vertical ranges; first linkage assemblies pivotally attaching said first support member to said frame assembly in parallel relation to said longitudinal axis for independent movement through its respective vertical range; second linkage assemblies pivotally attaching said second support member to said frame assembly in parallel relation to said longitudinal axis and spaced from said first support member for independent movement through its respective vertical range; and first and second independent power means the output members of which are attached to said first and second linkage assemblies, respectively, and function to move said first and second support members independently through their respective vertical ranges when actuated whereby roll movements may be imparted to components mounted on said support members.

2. Apparatus as set forth in claim 1: further characterized in that said first and second linkage assemblies each constitute a pair of individual scissor-type linkage means located respectively adjacent each of the ends of said first and second support members and said first and second power means each constitute individual power means respectively mounted in their entirety on each of said individual scissor-type linkage means.

3. An elevating dolly comprising: an elongated wheeled frame assembly symmetrically constructed about a longitudinal axis; first and second elongated support members; a first pair of individual linkage means located respectively adjacent the ends of said first support member and pivotally mounting said first support member on said frame assembly in parallel relation to said longitudinal axis for independent movement through a vertical range; a second pair of individual linkage means located respectively adjacent the ends of said second support member and pivotally mounting said second support member on said frame in parallel relation with respect to said longitudinal axis and spaced from said first support member for independent movement through a vertical range; individual power means mounted respectively on each of said individual linkage means and functioning to move said first and second support members independently through their respective vertical ranges when actuated; track means mounted on and extending laterally of said frame assembly and attach means on each of said individual linkage means, said attach means adapted to receive said track means and permit lateral movement of said individual linkage means with respect to said frame assembly.

4. An elevating dolly comprising: a frame assembly including a plurality of tubular members which in their assembled relation define a frame of U-shaped configuration when viewed in plan; wheeled support assemblies including parallelogram linkage structures mounted on said frame assembly adjacent the fore and aft ends thereof whereby said frame assembly may be moved on a supporting surface in a direction normal to the legs of said frame assembly; first and second elongated support members; first elevating linkage assemblies pivotally mounting said first support member in a juxtaposed relation directly above and adjacent to one leg of said frame assembly for independent movement through a predetermined vertical range directly above said one leg; second elevating linkage assemblies pivotally mounting said second support member in a juxtaposed relation directly above and adjacent to the other leg of said frame assembly for independent movement through a predetermined vertical range directly above said other leg; and first and second actuator means mounted respectively on said first and second linkage assemblies adapted to move said first and second support members simultaneously or independently through their respective vertical ranges when actuated.

5. Apparatus as set forth in claim 4: further characterized in that said first and second linkage assemblies each include individual scissor-type linkage means located respectively adjacent each of the ends of said first and second support members and said first and second actuator means each constitutes individual power means respectively mounted on each of said individual scissor-type linkage means.

6. An elevating dolly comprising: a wheeled frame assembly including a plurality of tubular members which in their assembled relation define a frame of U-shaped configuration when viewed in plan; first and second elongated support members; a first pair of individual linkage means located respectively adjacent each end of said first support member and pivotally mounting said first support member parallel and adjacent to one leg of said frame assembly for independent movement through a predetermined vertical range; a second pair of individual linkage means located respectively adjacent each end of said second support member and pivotally mounting said second support member parallel and adjacent to the other leg of said frame assembly for independent movement through a predetermined vertical range; individual power means mounted respectively on each of said individual linkage means and functioning to move said first and second support members independently through their respective vertical ranges when actuated; and each of said individual linkage means includes attach means mounting said individual linkage means on said frame assembly for lateral movement thereon in a direction normal to the legs of said frame assembly.

7. Apparatus as set forth in claim 6: further characterized in that said attach means includes track means fixedly attached to said frame assembly adjacent each corner thereof and a groove formed in each of said individual linkage means adapted to slideably receive a respective one of said track means.

References Cited in the file of this patent
UNITED STATES PATENTS

| | | |
|---|---|---|
| 1,255,775 | Mueller | Feb. 5, 1918 |
| 2,123,505 | Faries | July 12, 1938 |
| 2,274,821 | Bloxsom | Mar. 3, 1942 |
| 2,454,840 | Ryan | Nov. 30, 1948 |
| 2,471,901 | Ross | May 31, 1949 |
| 2,500,700 | Niles | Mar. 14, 1950 |
| 2,613,827 | Van Doorne | Oct. 14, 1952 |
| 2,826,319 | Renner et al. | Mar. 11, 1958 |